United States Patent
Annamraju

(10) Patent No.: US 10,084,715 B2
(45) Date of Patent: Sep. 25, 2018

(54) PACKET LOSS MITIGATION

(71) Applicant: Imagination Technologies Limited, Kings Langley (GB)

(72) Inventor: Venu Annamraju, Hyderabad (IN)

(73) Assignee: Imagination Technologies Limited, Kings Langley (GB)

( * ) Notice: Subject to any disclaimer, the term of this patent is extended or adjusted under 35 U.S.C. 154(b) by 91 days.

(21) Appl. No.: 14/576,498

(22) Filed: Dec. 19, 2014

(65) Prior Publication Data
US 2015/0180785 A1    Jun. 25, 2015

(30) Foreign Application Priority Data
Dec. 20, 2013 (GB) .................................. 1322657.6

(51) Int. Cl.
| H04J 3/18 | (2006.01) |
| H04L 12/825 | (2013.01) |
| H04L 12/26 | (2006.01) |
| H04L 12/801 | (2013.01) |

(52) U.S. Cl.
CPC .......... *H04L 47/25* (2013.01); *H04L 43/0829* (2013.01); *H04L 43/0894* (2013.01); *H04L 43/062* (2013.01); *H04L 47/12* (2013.01)

(58) Field of Classification Search
None
See application file for complete search history.

(56) References Cited

U.S. PATENT DOCUMENTS

| 2008/0151776 A1* | 6/2008 | Kure | H04L 1/0007 370/253 |
| 2009/0327918 A1* | 12/2009 | Aaron | H04L 1/0009 715/751 |
| 2010/0054279 A1* | 3/2010 | Feldbauer | G10L 19/005 370/475 |
| 2010/0226262 A1* | 9/2010 | Liu | H04N 21/2383 370/252 |

(Continued)

FOREIGN PATENT DOCUMENTS

| JP | 2006262288 A | 9/2006 |
| JP | 2009278521 A | 11/2009 |

(Continued)

*Primary Examiner* — Kwang B Yao
*Assistant Examiner* — Juvena Loo
(74) *Attorney, Agent, or Firm* — Vorys, Sater, Seymour and Pease LLP; Vincent M DeLuca

(57) ABSTRACT

A method of generating a sequence of packets representing a stream of one or more media frames at an encoding system, the method comprising: in dependence on a measure of data loss over a network, determining a level of error correction data required in respect of a stream of media frames in order to substantially satisfy a recovery parameter expressing a target proportion of packets recoverable using error correction data; in dependence on the determined level of error correction data, identifying a target encoding bitrate so as to not exceed a target transmission bitrate over the network; encoding the stream of media frames so as to generate encoded data at the target encoding bitrate; and processing the encoded data and error correction data formed in respect of the stream of media frames so as to generate a sequence of packets at a rate commensurate with the target transmission bitrate.

20 Claims, 3 Drawing Sheets

(56) References Cited

U.S. PATENT DOCUMENTS

| | | | |
|---|---|---|---|
| 2011/0182195 A1* | 7/2011 | Oikawa | H04L 1/0034 370/252 |
| 2012/0039194 A1* | 2/2012 | Kure | H04N 19/30 370/252 |
| 2012/0287986 A1* | 11/2012 | Paniconi | H04N 19/115 375/240.02 |
| 2013/0003571 A1* | 1/2013 | Ochiai | H04L 1/0014 370/252 |
| 2014/0153637 A1* | 6/2014 | Imai | H04N 19/67 375/240.02 |

FOREIGN PATENT DOCUMENTS

| | | |
|---|---|---|
| JP | 2010041326 A | 2/2010 |
| WO | 2012072148 A1 | 6/2012 |

* cited by examiner

PACKET LOSS MITIGATION

BACKGROUND OF THE INVENTION

This invention relates to a method and data processing system for mitigating packet losses for a stream of transmitted data packets.

Real-time streaming of multimedia content over the internet has become an increasingly common application in recent years. A wide range of multimedia applications, such as on-demand TV, live TV viewing, video conferencing, net meetings, video telephony and many others rely on end-to-end streaming solutions. Unlike a "downloaded" video file, which may be retrieved first in "non-real" time and viewed or played back later, streaming video applications require a video source to encode and to transmit a video signal over a network to a video receiver, which must decode and display the video signal in real time.

Compression techniques for transmitting video data can use so-called reference frames. When compressing blocks of video data, the encoding process can generate intra frames (I-frames). An I-frame is a compressed version of a frame which can be decompressed using only the information in the I-frame itself, and without reference to other frames. They are sometimes referred to as key frames. Another type of frame can also be generated, which are sometimes referred to as inter or predictive frame (P-frames), which are generated by predictive inter frame coding based on a reference frame. The reference frame can be the preceding frame, or it could be a different earlier or later frame in a sequence of frames. The size of the encoded frames can also depend upon the amount of detail in the video sequence to be encoded. Thus, I-frames generally require a greater amount of data than P-frames as I-frames are not based on any other frames.

Problems can arise when a streaming video signal is transmitted across a network, such as the Internet. For example, a significant packet loss rate across the transmission network often requires re-transmission of the lost packets. Typically, the lost data packets needs be recovered prior to the time the corresponding frame must be decoded. If the lost packet is not received, the current frame being processed as well as the subsequent frames can be adversely affected because of the predictive coding. Thus some error correction methods are needed.

Forward Error Correction (FEC) is a method in which some redundant packets (repair packets) are sent to a receiver along with the source data packets. The repair packets allow packet losses to be recovered at the receiver. The repair packets are included in the transmitted stream of packets before it is known whether any packet losses have occurred at the receiver and if any repairs are necessary. The advantage of FEC is that retransmission of data can often be avoided (at the cost of higher bandwidth requirements on average) and is therefore applied in situations where longer round-trip transmission latencies or the lack of a feedback channel can make retransmissions infeasible or impossible. Typical scenarios include, for example, real-time voice or video data, IP multimedia multicasting, and wireless broadcasting systems.

In FEC, the transmitting device introduces N−K repair packets for every K data packets transmitted. FEC codes such as Reed-Solomon have a zero reception overhead and an associated error recovery probability of 1. This implies that when the receiver receives any and at least K out of the N number of packets, the receiver can successfully recover all the K data packets at all times. The reception overhead and corresponding error recovery probability varies for different FEC codes by their design. For codes having a reception overhead δ and a corresponding error recovery probability of n, the receipt of K(1+δ) packets will lead to an error recovery probability of n. The examples herein consider an FEC code with zero reception code overhead.

SUMMARY OF THE INVENTION

According to a first aspect of the invention there is provided a method of generating a sequence of packets representing a stream of one or more media frames at an encoding system comprising a media encoder, the sequence of packets being for transmission over a network, the method comprising: in dependence on a measure of data loss over the network, determining a level of error correction data required in respect of a stream of media frames in order to substantially satisfy a recovery parameter expressing a target proportion of packets recoverable using error correction data; in dependence on the determined level of error correction data, identifying a target encoding bitrate so as to not exceed a target transmission bitrate over the network; encoding the stream of media frames so as to generate encoded data at the target encoding bitrate; and processing the encoded data and error correction data formed in respect of the stream of media frames so as to generate a sequence of packets at a rate commensurate with the target transmission bitrate.

Preferably, the step of encoding the stream of media frames comprises encoding the stream of media frames at a rate commensurate with a frame rate of the stream.

Preferably, the determining and identifying steps together comprise: for each of a plurality of numbers of data packets per group of one or more frames, calculating a respective candidate encoding bitrate in dependence on: said target transmission bitrate; a number of error correction packets determined, using said measure of data loss, for the number of data packets so as to satisfy said recovery parameter; and a packetisation overhead associated with the total number of data and error correction packets; and selecting the highest calculated candidate encoding bitrate as the target encoding bitrate, the respective number of error correction packets representing said level of error correction data.

The number of error correction packets may be determined by means of a lookup table comprising, for each of a plurality of different measures of data loss over the network, different numbers of data packets and, for each number of data packets, a corresponding number of error correction packets required in order to substantially satisfy the recovery parameter.

The method may further comprise: receiving a report indicative of a number of lost data packets for a prior group of one or more frames represented by a known number of data packets; identifying a data point in the lookup table having the number of error correction packets equal to number of lost data packets and the known number of data packets; and using the data loss associated with the identified data point as said measure of data loss.

The packetisation overhead may not be said encoded data or said error correction data.

The level of error correction data may be the number of error correction packets relative to the sum of the numbers of data packets and error correction packets.

The step of generating the sequence of packets may be performed such that each group of one or more frames of the stream of media frames is represented by the numbers of data packets and error correction packets corresponding to the selected highest encoding bitrate.

The method may further comprise: in dependence on the selected highest encoding bitrate, determining an amount of encoded data to be transmitted for a particular group of one or more frames of the stream of media frames; determining a packet size of data packets so as to substantially evenly distribute said amount of encoded data amongst data packets for said particular group such that the number of data packets for said particular group is equal to the number of data packets corresponding to the selected highest encoding bitrate; and performing the step of generating the sequence of packets such that the packet size for the particular group is less than or equal to the determined packet size.

Said each of the plurality of numbers of data packets may be a different number such that each of the candidate encoding bitrates corresponds to a number of data packets per group of one or more frames that is different to the other candidates.

The method may further comprise: reducing the highest calculated encoding bitrate in dependence on a quantisation noise coefficient; and using that reduced highest encoding rate as the target encoding bitrate.

The step of calculating a respective candidate encoding bitrate may comprise: calculating a packetisation overhead bitrate by multiplying said packetisation overhead by the number of data and repair packets and a number of groups of one or more frames to be transmitted per second; subtracting the packetisation overhead bitrate from the target transmission bitrate so as to form a subtraction result; and multiplying said subtraction result by a data packet ratio calculated by dividing the number of data packets by the sum of the number of data packets and the number of error correction packets.

According to a second aspect of the invention there is provided an encoder system for generating a sequence of packets representing a stream of one or more media frames, the sequence of packets being for transmission over a network, and the system comprising: a media encoder operable to generate encoded data from a stream of media frames in accordance with an encoding bitrate; a quality controller configured to: in dependence on a measure of data loss over the network, determine a level of error correction data required in respect of a stream of media frames in order to substantially satisfy a recovery parameter expressing a target proportion of packets recoverable using error correction data; in dependence on the determined level of error correction data, identify a target encoding bitrate so as to not exceed a target transmission bitrate over the network; and cause the media encoder to adapt its encoding bitrate so as to generate encoded data from the stream of media frames at the target encoding bitrate; and a packetiser configured to process the encoded data and error correction data formed in respect of the stream of media frames so as to generate a sequence of packets at a rate commensurate with the target transmission bitrate.

Preferably, the media encoder is configured to encode media frames of the stream at a rate commensurate with a frame rate of the stream.

Preferably, the quality controller is configured to determine said level of error correction data and identify said target encoding bitrate by, for each of a plurality of numbers of data packets per group of one or more frames, calculating a respective candidate encoding bitrate in dependence on: said target transmission rate; a number of error correction packets determined, using said measure of data loss, for the number of data packets so as to satisfy said recovery parameter; and a packetisation overhead associated with the total number of data and error correction packets, the quality controller being further configured to select the highest calculated candidate encoding bitrate as the target encoding bitrate, the respective number of error correction packets representing said level of error correction data.

The number of error correction packets may be determined by means of a lookup table comprising, for each of a plurality of different measures of data loss over the network, different numbers of data packets and, for each number of data packets, a corresponding number of error correction packets required in order to substantially satisfy the recovery parameter.

The quality controller may be configured to: receive a report indicative of a number of lost data packets for a prior group of one or more frames represented by a known number of data packets, identify a data point in the lookup table having the number of error correction packets equal to number of lost data packets and the known number of data packets; and use the data loss associated with the identified data point as said measure of data loss.

The packetiser may be configured to generate the sequence of packets such that each group of one or more frames of the stream of media frames is represented by the numbers of data packets and error correction packets corresponding to the selected highest encoding bitrate.

The quality controller may be further configured to: in dependence on the selected highest encoding bitrate, determine an amount of encoded data to be transmitted for a particular group of one or more frames of the stream of media frames; determine a packet size of data packets so as to substantially evenly distribute said amount of encoded data amongst data packets for said particular group such that the number of data packets for said particular group is equal to the number of data packets corresponding to the selected highest encoding bitrate, the packetiser being configured to generate the sequence of packets such the packet size for the particular group is less than or equal to the determined packet size.

The quality controller may be further configured to reduce the highest calculated encoding bitrate in dependence on a quantisation noise coefficient and use that reduced highest encoding rate as the target encoding bitrate.

According to a third aspect of the invention there is provided machine readable code for generating the encoder system.

According to a fourth aspect of the invention there is provided a machine readable storage medium having encoded thereon non-transitory machine readable code for generating the encoding system.

According to a fifth aspect of the invention there is provided machine readable code for implementing the method.

According to a sixth aspect of the invention there is provided a machine readable storage medium having encoded thereon non-transitory machine readable code for implementing the method.

DESCRIPTION OF THE DRAWINGS

The present invention will now be described by way of example with reference to the accompanying drawings. In the drawings.

DETAILED DESCRIPTION OF THE DRAWINGS

The following description is presented to enable any person skilled in the art to make and use the invention, and is provided in the context of a particular application. Various modifications to the disclosed embodiments will be readily apparent to those skilled in the art.

The general principles defined herein may be applied to other embodiments and applications without departing from the spirit and scope of the present invention.

Thus, the present invention is not intended to be limited to the embodiments shown, but is to be accorded the widest scope consistent with the principles and features disclosed herein.

There is a need for a system that transmits data such that the effects of packet losses at the receiver are mitigated.

Embodiments described herein provide an improved mechanism for mitigating packet losses to provide a required level of quality for a media stream. In the examples below, a mechanism for mitigating packet losses for a video stream implemented at a system that encodes video is described. However, the mechanism can be applied to other types of media encoder systems, such as audio encoders, that encode media and generate packets representing the media for transmission over a network.

Figure 1:
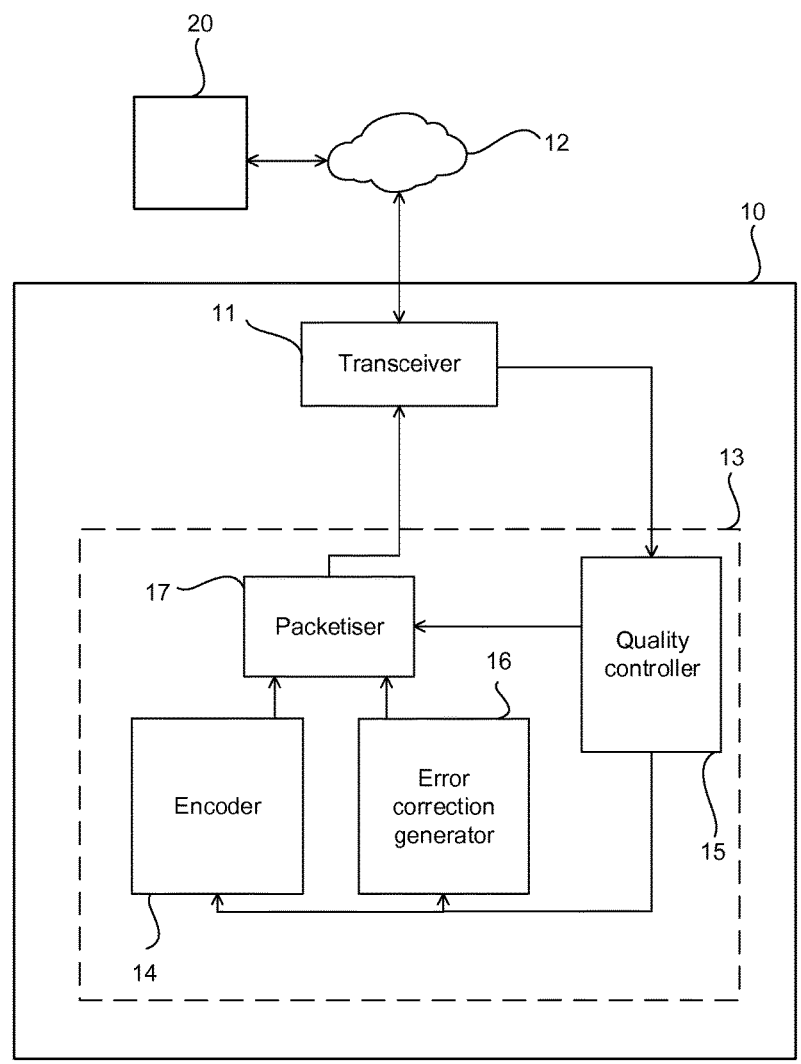
FIG. 1 is a schematic diagram of a device capable of transmitting media frames as a sequence of packets over a network.

FIG. 1 depicts a transmitting device 10, which may be any suitable device that is capable of generating packet based data such as a computer, smartphone, videophone, etc. The transmitting device 10 comprises a transceiver 11 for connection to a communications network 12 such as the internet or other packet based networks. The transmitting device 10 can transmit and/or receive data packets to and/or from the communications network 12 via the transceiver 11.

The transmitting device 10 comprises an encoding system 13. The encoding system comprises an encoder 14 for encoding video data that is to be transmitted over the communications network 12 to a receiving device 20. The video data may be encoded according to a video coding standard such as H.263 or H.264 (AVC or ISO/IEC 14496-10) or any other FEC compatible standard. Encoded video is built up of a sequence of contiguous frames. The frames can include P-frames and I-frames. P-frames contain data representing the difference between the frame and one or more reference frames. I-frames are frames representing the difference between pixels within a frame, and as such can be decoded without reference to another frame. Each frame in turn is built up of a sequence of packets. The encoder 14 can encode the video data at a required frame rate. The required frame rate may be defined by, for example, a user and/or video codec standard.

In some cases, for example for real-time video, it can be advantageous to transmit the encoded video at a constant or near-constant transmission bitrate. There is a need to maintain constant outgoing bandwidth in order to be conformant to a prescribed bandwidth limit in an end-to-end Quality of Service (QoS) enabled network. The prescribed bandwidth limit may be dependent on a combination of factors such as network operator policy, user profile and QoS settings, device capability, link quality, link capacity and link usage, etc.

In most end-to-end controlled networks, such as 2G/3G/4G/LTE and core telecom backbone including legacy networks, bandwidth is allocated for each media stream which is rate limited at defined points in the network (mostly ingress points). Time averaged metrics are employed by the rate limiters and any excess bandwidth in a 1-2 seconds window can be trimmed by discarding packets. In such networks, the proportion of packets representing the excess bandwidth will be discarded resulting in a bandwidth induced loss in addition to other losses. In QoS enabled end-to-end networks, bandwidth allocation improves link utilization and in meeting quality of service requirements and allows for better traffic planning.

In general, it is advantageous for a media stream to be well behaved, predictable and controllable with respect to bandwidth utilization.

In an end-to-end QoS enabled network the bandwidth limit may be explicitly communicated by a network entity to moderate bandwidth usage and availability, However there are scenarios where an end-point may be required to implicitly infer available bandwidth based on observing one or more media parameters.

In uncontrolled networks, such as Wi-Fi and the internet, there is no bandwidth allocation, guarantee or notification of available bandwidth. Congestion can occur at any time in response to one's own bandwidth exceeding the shared link capacity, or due to interference, channel conditions, multiple devices, and possibly other media and data streams from other applications running on the same device, such as firmware download, FTP downloads, etc.

Also, in the transmission of media stream through edge links such as Wi-Fi hotspots, home routers, internet modems and internet backbone, the media stream is multiplexed along with other flows at each router which can be a common pipe. These flows can comprise of real-time and non-real time traffic and can be adaptive to available bandwidth, TCP is one such type. The resulting contentions between various adaptive flows can result in a varying perception of bandwidth availability necessitating bandwidth adaptation and discovery.

As a result of dynamic network bandwidths and losses, the target bandwidth for transmission can be increased and decreased to adapt to the available bandwidth without (or minimally) disrupting the quality experience, where the outgoing bandwidth is expected to be fairly constant while incorporating FEC bandwidth in response to varying losses in such a way that lossless quality is delivered at the other end.

The constant outgoing bandwidth criterion can be satisfied when mitigating variable loss rates encountered in the link by means of FEC techniques. FEC introduces a bitrate component that is a function of multiple parameters such as encoding bit rate, frame rate, target error-recovery probability, packetisation overheads, FEC span, etc. Preferably, the sum of encoding bitrate and FEC bitrate matches or is as close as possible to the given target transmission bitrate. To achieve optimal usage of the target transmission bit rate, the encoding bit rate should be maximised while simultaneously minimizing other dependent factors such as the FEC bitrate. Other competing factors which make it difficult for a transmitting device 10 to maintain a constant transmission bitrate include the FEC latency, overall packet rate, packetisation overhead, the varying amount of data for each frame (as P-frames can vary in size due to the amount of prediction required) and fluctuations in data or packet losses over the communication network.

The encoder system 13 comprises a quality controller 15 which helps to optimise a number of parameters for each group of one or more frames of video in order to mitigate losses over the communication network 12 and in order to provide a required level of quality at the receiving device 20 whilst maintaining conformance with a target constant transmission bitrate.

The quality controller 15 can determine a level of error correction required in order to substantially satisfy a recovery parameter, which expresses a target proportion of data packets that can be recovered using error correction. The recovery parameter may be a probability γ that an error occurring at the receiving device 20 can be recovered. For example, the error at the receiving device 20 may be a lost or corrupted data packet that was sent by the transmitting device 10 and the recovery parameter is a probability γ that the lost or corrupted data packet is recovered at the receiving device via the error correction. The quality controller 15 determines the level of error correction, for example a number of error correction packets (or "repair packets"), that is required to be transmitted by the transmitting device 10 so that there is a γ probability that the lost or corrupted data packet is recovered by via the error correction.

An appropriate γ value can be selected to provide a required level of video quality at the receiving device 20. Preferably, a γ value of 0.99 corresponds to a near-lossless quality of video being decoded at the receiving device 20.

In order to determine the level of error correction that will achieve the γ objective, a measure of data loss over the network 12 is also used. This loss measure may be an estimate of the percentage loss of data or packets that is transmitted over the network 12 to the receiving device 20. The measure can be determined by, for example, receiving periodic reports from the receiving device 20 indicating packet loss. One way of determining packet loss is by assigning a sequence number to each packet sent by the transmitting device 10. The receiving device 20 can then determine the packet loss by counting how many sequence numbers failed to arrive. Thus as the conditions of the network change over time or the amount of data to be sent changes, an appropriate level of error correction can be determined so that the γ objective can be maintained.

The following paragraphs related to a lookup table describe one way of determining the level of error correction required to achieve the γ objective. The transmitting device 10 may comprise a data structure such as a lookup table that stores calculated levels of protection for data to be transmitted over the network 12.

In this example, where the error correction technique utilises FEC repair packets, the lookup table can comprise a calculated number of repair packets for different numbers of data packets at different measures of data loss over the network for different γ objectives. Thus each data point in the lookup tables relates to: a) a number of repair packets; b) a number of data packets; c) a measure of data loss; and d) a γ objective. Thus, the lookup table can be used to determine the number of repair packets required to protect a given number of data packets so as to achieve a γ probability of recovering a lost data packet at the receiving device for a measure of the packet loss over the network.

The lookup table can be formed using a binomial Cumulative Distribution Function (CDF) to calculate the number of repair packets for a given number of data packets so as to achieve γ probability of packet loss recovery for randomly distributed losses. The binomial probability density function (PDF) gives the probability of exactly x failures out of a total of n experiments, each experiment's outcome having a uniform (random) failure probability p, which does not depend on previous outcomes. The binomial CDF for x is the total probability of at most x failures out of n experiments. The binomial CDF is a summation of individual probabilities of exactly 0, 1, 2, . . . x failures out of n experiments. In the example below, failure is a packet loss, n experiments is the total number of packets, x is the lost packets out of n and p is the packet loss probability which is uniformly (randomly) distributed.

The binomial CDF, F(x; n, p), can be generated using the following equation:

$$F(x; n, p) = Pr(X \leq x) = \sum_{i=0}^{x} \binom{n}{i} p^i (1-p)^{n-i} \quad (1)$$

where $$\binom{n}{i} = \frac{n!}{i! \cdot (n-i)!} \text{ and } n! = n \cdot (n-1) \cdot (n-2) \cdots 3 \cdot 2 \cdot 1,$$

X is a random variable, x is the number of repair packets, p is the probability of losing a packet over the network and n is the total number of packets to be transmitted.

The value x is found such that $$Pr(X \leq x) \approx \gamma \quad (2)$$

As mentioned above, the γ value may be chosen so as to achieve a target recovery probability. For example, the γ value may be between 0.95 and 0.99. Preferably, the γ value is 0.99. A value of ≈0.99 can be considered to represent near-lossless transmission.

The value of x is calculated for a) a number of data packets, (n−x), and b) a loss probability p value. Preferably, x is determined for each value of n ranging from 1 to 255 and for each p value from 0.01 to 0.5 in steps of 0.01, which corresponds to packet loss rates from 1% to 50%.

The calculated x value for each number of data packets (n−x) for each loss probability p values can be stored in the lookup table. By storing the values in the lookup table, the quality controller 15 can quickly determine the number of repair packets that are required for a given number of data packets and a determined loss estimate to achieve the target data packet recovery at the receiving device. By providing a lookup table the quality controller 15 does not have to perform the calculation each time a number of repair packets need to be determined. Less preferably, instead of using the lookup table, the quality controller 15 can carry out the calculation to determine the number of repair packets each time it is required.

Some indices of the binomial CDF may not be determined as (n−x) is itself dependent on x. In this case, the value for the index can be populated by interpolating them from adjacent values.

The table shows a sample of an exemplary lookup table for γ=0.99, p between 0.15 and 0.19, K between 65 and 70, where K≡(n−x) and the calculated P, where P≡x.

|   |    |    |    |    |    |    | p    | γ    |
|---|----|----|----|----|----|----|------|------|
| K | 65 | 66 | 67 | 68 | 69 | 70 | 0.15 | 0.99 |
| P | 21 | 21 | 21 | 22 | 22 | 22 |      |      |
| K | 65 | 66 | 67 | 68 | 69 | 70 | 0.16 | 0.99 |
| P | 22 | 23 | 23 | 23 | 23 | 24 |      |      |
| K | 65 | 66 | 67 | 68 | 69 | 70 | 0.17 | 0.99 |
| P | 24 | 24 | 24 | 25 | 25 | 25 |      |      |

|   |    |    |    |    |    |    | p    | γ    |
|---|----|----|----|----|----|----|------|------|
| K | 65 | 66 | 67 | 68 | 69 | 70 | 0.18 | 0.99 |
| P | 25 | 26 | 26 | 26 | 26 | 26 |      |      |
| K | 65 | 66 | 67 | 68 | 69 | 70 | 0.19 | 0.99 |
| P | 27 | 27 | 27 | 28 | 28 | 28 |      |      |

The amount of error correction needed to achieve the γ objective can be dependent on the amount of video data that needs protecting. Preferably, the amount of error correction is determined for the amount of data encoded at the encoder for a group of one or more video frames. The encoder may be operating at an initial or current encoding rate and frame rate and so the amount of data encoded for a group of one or more frames can be determined. The quality controller 15 is then capable of determining the amount of error correction data required for that group of one or more frames.

In the example that the error correction technique utilises FEC repair packets, the number of repair packets required to achieve the γ objective is dependent on the number of data packets to be protected. Preferably, the number of repair packets is determined for the number of data packets representing a group of one or more encoded video frames. The number of data packets for the group of one or more video frames can be determined from an initial or current packet size, the frame rate and the current encoding bitrate. The number of repair packets can then be determined, as described above.

The error correction data to be transmitted can be generated using known techniques, for example, Reed-Solomon codes. The error correction data can be generated by an error correction generator 16.

The error correction data, together with the encoded frame data, is to be transmitted at a target constant bit rate, as mentioned above. The quality controller 15 can identify a target encoding bitrate for the encoder 14 which would allow the encoded video data and the error correction data to be transmitted so as to substantially maintain a target transmission bitrate. For example, knowing the target transmission bitrate and the amount of error correction data associated with an encoded frame, a target encoding rate for the encoder 14 can be calculated that would allow the sum of the encoded frame data and error correction data to be transmitted at the target transmission bitrate.

For example, the following method may be used to identify a target encoding bitrate:

1. Determine a measure of packet loss. This may be done, for example, by estimating the loss probability of packets within an FEC span. An FEC span is the duration of a group of packets in the media stream for which error recovery is provided by an associated group one or more FEC repair packets. The group of packets of the FEC span may represent one or more frames. Preferably, an FEC span represents an integer number of frames. The loss probability may be estimated by:

Loss probability=number of lost packets per FEC span/number of packets transmitted per FEC span The number of packets transmitted per FEC span may be known by the transmitting device 10 as it previously transmitted the packets in that span. The number lost packets may be known by the receiving device 20 reporting back to the transmitting device 10 the number of lost packets for that FEC span, as mentioned above.

Alternatively, the loss probability p may be determined using the following method:

1 a) Set the number of reported packets lost in the FEC span to the number of repair packets ($P_L$). For the reported FEC span, the transmitter has information of the number of data packets ($K_L$) that were previously transmitted. As mentioned above, to recover a number of lost packets, the same number of repair packets need to be received.

1b) From the lookup table, find a data point in the table which has the number of repair packets equal the value of $P_L$ for the number of $K_L$ packets in that FEC span from step 1a for the required recovery parameter.

Preferably, the lookup table may be arranged as a matrix where each row index corresponds to a loss probability, each column index represents the $K_L$ data packets and the value at each intersection of row index and column index represents $P_L$ packets that achieves a recovery probability of γ for a total of ($K_L+P_L$) packets transmitted in a network having p loss probability. Finding the data point in such a table involves finding the row equivalent to p loss probability intersecting the column equivalent to $K_L$ packets such that the intersection value equals $P_L$ packets.

In some cases, $P_L$ packets may not equal a value in the lookup table and may lie between two consecutive rows in the table, which is likely at higher losses. In such cases, either the loss probability p corresponding to an above or below row or an average probability corresponding to the two rows may be determined as the instantaneous loss probability estimate.

1c) Preferably the instantaneous loss estimate is suitably averaged over a defined time interval or other such processing is performed to yield p, the current loss probability.

2. The determined loss probability p is used by the transmitter to further determine different combinations of candidate encoding bitrates and error correction bitrates that meet the target transmission bitrate. Candidate encoding bitrates are determined for different values for the number of data packets in an FEC span ($K_T$) and their corresponding values for the number of repair packets in the FEC span ($P_T$) that meet the target recovery objective γ.

3. From the candidate values of $K_T$ and $P_T$, which determine the encoding and error correction bitrates respectively, the values of $K_T$ and $P_T$ that provides the maximum encoding bitrate are selected.

Simply, steps 2 and 3 may be carried out by determining the highest K/P ratio from the lookup table for K and P values having the loss probability p determined at step 1 and having the required target recovery objective γ. The highest K/P ratio can then be applied to the target transmission bitrate to determine corresponding encoding and FEC bitrates.

The error correction generator 16 can also be set to generate error correction data at the same bitrate as the target encoding bitrate or at a fixed proportion of target transmission bitrate. Thus, the sum of the encoding bitrate and the error correction generation bitrate is the same as the target transmission bitrate.

Figure 2:
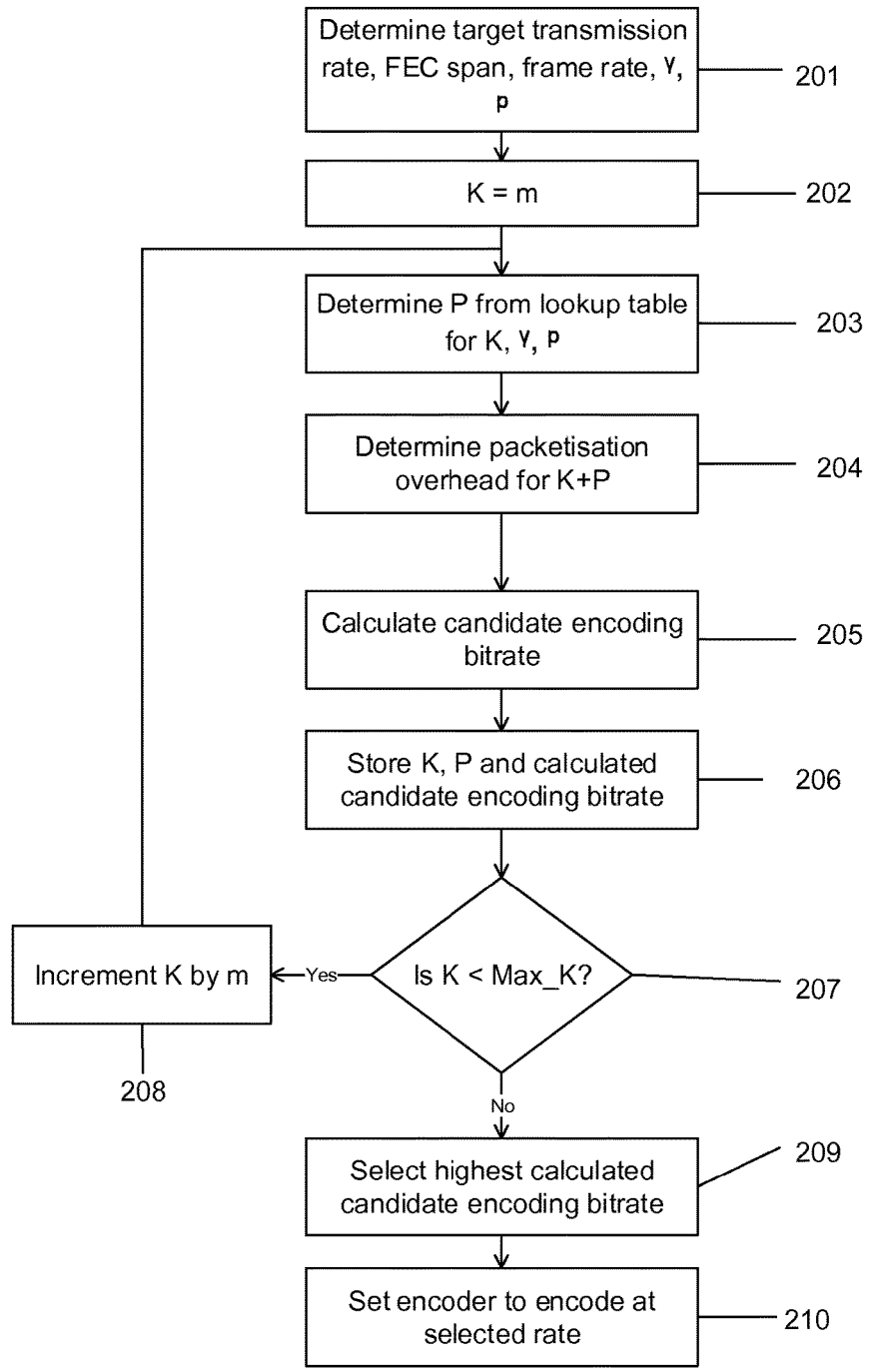
FIG. 2 is a flowchart illustrating a process for determining an optimal encoding bitrate.

FIG. 2 describes another example method, which calculates an optimal encoding bitrate that allows the target transmission bitrate to be maintained and the error recovery objective to be satisfied where the error correction technique involves the use of FEC repair packets. Various competing factors are considered for determining the optimal encoding bit rate. For example, over an FEC span (which is a time span within which any data packets generated during that time span are protected by associated repair packets), the FEC overhead decreases for an increasing number of data packets. One approach to minimising the FEC overhead is to increase the FEC span, but this can lead to undesirable latencies. Another approach is to break the frames into smaller packet sizes, but this can lead to an increase in the packetisation overhead (e.g. due each packet having data associated with the header of the packet) and also lead to higher packet rates. The method described below with reference to FIG. 2 determines how an optimal configuration, based on various competing parameters, can be determined while meeting the γ objective.

At step 201, the quality controller 15 determines the target transmission rate, the probability p of losing a packet, the γ objective, the desired FEC span and the frame rate at which the video data is to be encoded.

At step 202, the quality controller 15 begins a loop in which candidate encoding bitrates are determined for different numbers of data packets K representing a FEC span comprising of m frames, from K=m to an upper limit K=max_K. At this step, the number of data packets K for representing a FEC span is initially set to m. Preferably, where the FEC span consists of say m frames, candidate encoding bitrates may be determined from K=m to an upper limit K=max_K and K may be incremented by m each time. For example, a FEC span may consist of 3 frames and candidate encoding bitrates may be determined only for K=3, 6, 9, 12 and so on. This allows each frame in the FEC span to be packetised into a constant number of data packets.

At step 203, from the probability p of losing a packet, γ objective, the number of repair packets P for protecting K data packets is determined from the lookup table.

At step 204, the packetisation overhead associated with total number of data and repair packets (K+P) to be transmitted for that FEC span is calculated. Based on the FEC span, the bitrate for the packetisation overhead can be determined as follows:

Packetisation overhead bitrate=packetisation overhead per packet×(K+P)×number of FEC spans per second It may be noted that the packetisation overhead per data packet and per repair packet may be different. For example, extra data may be required in the packetisation of each repair packet compared to the packetisation of a data packet.

At step 205, a candidate encoding bitrate is calculated in dependence on the target transmission rate, the overhead determined at step 204 and K and P. For example, the calculation could be:

Candidate encoding bitrate=(target transmission bitrate−packetisation overhead bitrate)×(K/(K+P))

At step 206, K, P and the determined candidate encoding bitrate for K is temporarily stored in a table.

At step 207, the process then checks if K has reached Max_K, which may be a predetermined number. Max_K may be determined based on the error correction technique utilised. For example, in the case of Reed Solomon codes defined over a Galois Field of size 255 (also termed as GF(255)), K+P<255 and thus K would be constrained accordingly. If K is less than Max_K, the process moves on to step 208. If K is not less than the Max_K, the process moves on to step 209.

At step 208, K is incremented by m and the process loops back to step 203 to determine another candidate encoding bitrate for the incremented value of K.

At step 209, the quality controller 15 selects the highest candidate encoding bitrate from the table and the corresponding K and P values for the selected encoded bitrate.

At step 210, the quality controller 15 then sets the encoder 14 to encode at the selected encoding bitrate. The quality controller 15 also sets a packetiser 17 (described below) to form K and P packets for the encoded data and error correction data respectively for an encoded frame. Once the parameters are set by the quality controller 15, the stream of frames can be encoded and packetised at those settings.

The setting of the encoding bitrate and associated K and P values can be dynamic. The process for determining the optimal encoding rate (and associated K and P values) can be carried out in response to a change in any of the parameters used in the process, such as the probability p of losing a data packet, the γ objective, the frame rate, target transmission rate, the desired FEC span, the packetisation overhead, an updated lookup table, etc.

Other parameters may be utilised to determine the candidate encoding rates. For example and as mentioned above, the FEC overhead is dependent on the FEC span and so the candidate encoding rates can be determined for different FEC spans. The FEC span may be determined such that it represents one or more frames. The FEC span duration may be set at a predetermined value or adapted depending on transmission conditions. For example, in some cases there may be a high packet loss rate and/or a low transmission bitrate which can lead to the level of error correction (i.e. number of repair packets and consequently the error correction bitrate) required being relatively high compared to the amount of data packets sent. In this case, the controller 15 can adapt the FEC span duration so that there are more data packets (and thus more frames) sent over the FEC span. The relative number of error packets decreases as the number of data packets in an FEC span increases, thus increasing the FEC span duration leads to a reduction in the FEC overhead. However, an increase in the FEC span can also introduce unwanted latency effects as the duration of the span has increased and so the repair packets will arrive after longer period of time at the end of the FEC span. Thus, the quality controller 15 may adapt the FEC span duration to offset the latency effect by limiting the maximum possible FEC span in dependence on a roundtrip delay estimate and/or the encoding bitrate.

Figure 3:
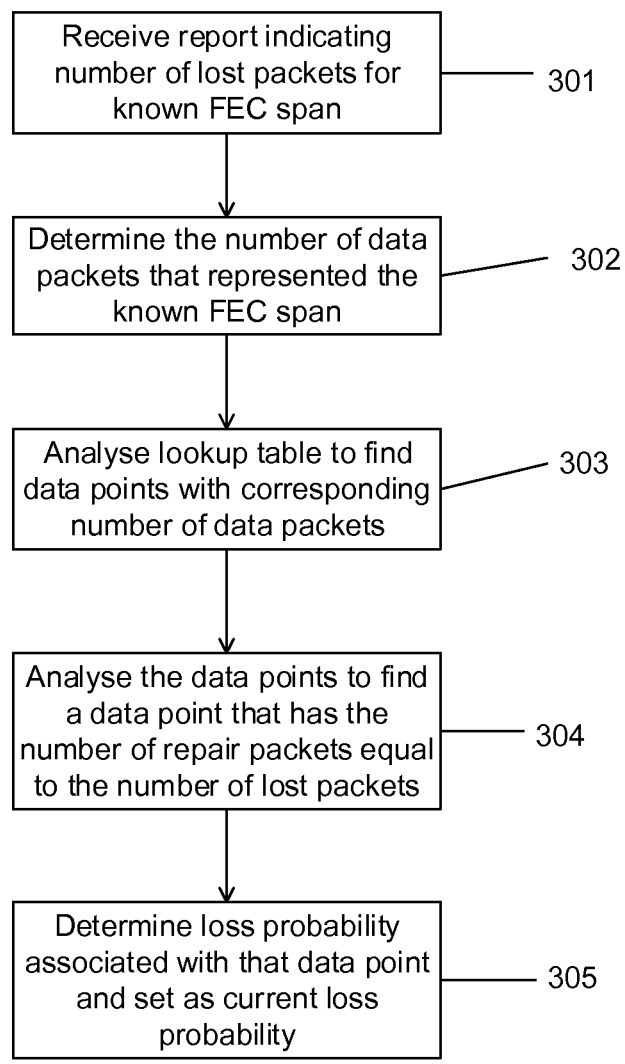
FIG. 3 is a flowchart illustrating a process for determining a measure of loss in the network.

As mentioned above, the data loss over the network 12 can be estimated by receiving feedback reports from the receiving device 20. The reports can indicate the total number of lost data packets for a FEC span. Using the number of lost packets in the FEC span, the number of data packets for that FEC span, and the lookup table, the probability p of losing a packet over the network 12 can be estimated, as described with reference to the flow diagram of FIG. 3.

At step 301, the transmitting device 10 receives a report that indicates a number of lost packets for a FEC span that was previously sent to the receiving device 20. The number of data packets representing FEC span is known to the quality controller 15 as the transmitting device 10 previously transmitted that span. Thus, at step 302, the number of data packets for the FEC span can be determined. At step 303, the quality controller 15 analyses the lookup table to find the data points that correspond to the number of data packets sent for that FEC span. At step 304, those data points are then searched to find the data point that has a number of repair packets that is equal to the number of lost packets. At step 305, the probability p associated with the data point that has a matching number of repair packets to the lost packets is then determined to be the current loss probability p of the network for the relevant γ objective. The newly determined loss probability p can then be used to determine the level of error correction required to meet the γ objective. Thus the level of error correction to be used can be adapted over time as conditions in the network changes.

Alternatively to setting p determined at step 305 as the loss probability for determining the number of repair packets, steps 301 to 305 can be repeated a number of times for a corresponding number of received reports to determine an average p. The average p can then be set as the loss probability. This may be advantageous as the p determined from each report may be highly variable and it could be disadvantageous to continuously change the codec bitrates on a per received report basis (which may be a per FEC span basis), which may lead to overly frequent video resolution changes. Thus a smoothened average can be advantageous. The average may be provided by a simple average over a fixed number of reports or FEC spans or frames or time interval. Alternatively, for each reported FEC span, a histogram with preferably a percentile value that is the same as the γ objective, may be formed from a fixed number of preceding reports or FEC spans or frames or time interval.

The encoder 14 may be caused to operate at a slightly reduced encoding bit rate than the selected highest encoding bitrate candidate, selected at step 209 above. During the process of evaluating different values of K, especially at low losses, there will be minor fluctuations in the candidate target encoding bitrate values because the table can only contain integer values P packets for increasing values of K. Thus minor fluctuations will be evident due to the quantisation of each increment in P. The quality controller 15 can lower the highest encoding bitrate by an appropriate coefficient to account for the quantization effect. Preferably, the coefficient is 0.95 times the selected highest encoding bitrate, but the coefficient could alternatively be a value between 0.85 and 0.99. Lowering the encoding bitrate in this way also leads to a corresponding lowering of the packet rate, which can be advantageous in wireless links of a network path.

The encoder system 13 comprises a packetiser 17 which receives the encoded video frame from encoder 14 and divides the frame into a series of data packets for transmission via the transceiver 11. Each data packet generated by the packetiser 17 includes a portion of the encoded video data, as well as any applicable packet header data (such as internet protocol header and any other protocol headers).

The packetiser 17 can receive appropriate parameters from the quality controller 15 so that the transmitting device transmits the formed packets substantially at the target transmission bitrate. Based on the total number of packets per FEC span and the required frame rate, the quality controller 15 can set the packet size and packet transmit rate so that the packetiser 17 generates packets for transmission at the target transmission bitrate.

As mentioned above, the error correction data generator 16 can generate error correction data based on the encoded video data. In the example of using repair packets as the error correction method, over an FEC span, data packets carrying the encoded video data are transmitted as and when they are ready. A copy of each data packet is maintained so that once the FEC span duration elapses, the error correction data generator 16 can generate error correction data for the repair packets for the FEC span using the copies of the data packets. The packetizer 17 then receives the error correction data from the generator 16 to form the required number of repair packets to protect the data packets in the FEC span.

The quality controller 15 may also adapt the packet size for each FEC span, which comprises one or more frames. Encoded frame sizes can vary when operating at a constant encoding bitrate and so the frame size may not match the size of the packets in the FEC span exactly. For this reason, the last packet for the frame in the FEC span may include some padding bytes. The quality controller 15 can adjust the packet size for the FEC span to minimise the padding in the last packet for each frame. The quality controller 15 adjusts the packet size so that each frame in the span is substantially evenly divided between the data packets and so that the number of data packets in a FEC span is as close as possible to, but not greater than, the value of K determined for the highest encoding rate.

The examples described herein provide many advantages when transmitting video data over a lossy network. Parameters of the encoder system can be optimised and applied to each video frame so that a generally equal level of protection can be applied to a series of video frames. This ensures that a near lossless video quality is achievable at the receiving device even though the video data is transmitted over a lossy network with randomly distributed losses at any configured target transmission bitrate and frame rate. The losses over the network can be quickly and accurately estimated so that reaction time to any changes in the network is minimized.

As described above, the encoder system can provide an optimization of the transmitted video data while considering various factors such as FEC latency, IP transport overhead, packetisation size, packet rate, and FEC bitrate, for any loss rate and target transmission bit rate. Furthermore all of this can be achieved whilst maintaining a near constant target transmission bitrate.

Encoder systems configured in accordance with the examples described herein could be embodied in hardware, software or any suitable combination of hardware and software. An encoder system as described herein could comprise, for example, software for execution at one or more processors (such as at a CPU and/or GPU), and/or one or more dedicated processors (such as ASICs), and/or one or more programmable processors (such as FPGAs) suitably programmed so as to provide functionalities of the encoder system, and/or heterogeneous processors comprising one or more dedicated, programmable and general purpose processing functionalities. Encoder systems described herein can comprise one or more processors and one or more memories having program code stored thereon, the processors and the memories being such as to, in combination, provide the claimed encoder systems and/or perform the claimed methods.

Data processing units described herein (e.g. encoder, quality controller and packetizer) need not be provided as discrete units and represent functionalities that could (a) be combined in any manner, and (b) themselves comprise one or more data processing entities. Data processing units could be provided by any suitable hardware or software functionalities, or combinations of hardware and software functionalities.

The term software as used herein includes executable code for processors (e.g. CPUs and/or GPUs), firmware, bytecode, programming language code such as C or OpenCL, and modules for reconfigurable logic devices such as FPGAs. Machine-readable code includes software and code for defining hardware, such as register transfer level (RTL) code as might be generated in Verilog or VHDL.

Any one or more of the data processing methods described herein could be performed by one or more physical processing units executing program code that causes the unit(s) to perform the data processing methods. The or each physical processing unit could be any suitable processor, such as a CPU or GPU (or a core thereof), or fixed function or programmable hardware. The program code could be stored in non-transitory form at a machine readable medium such as an integrated circuit memory, or optical or magnetic storage. A machine readable medium might comprise several memories, such as on-chip memories, computer working memories, and non-volatile storage devices.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein, and without limitation to the scope of the claims. The applicant indicates that aspects of the present invention may consist of any such individual feature or combination of features. In view of the foregoing description it will be evident to a person skilled in the art that various modifications may be made within the scope of the invention.

The invention claimed is:

1. A method of generating a sequence of packets representing a stream of media frames, the sequence of packets being configured for transmission over a network, the method comprising:
   in dependence on a measure of data loss over the network, determining a level of error correction data required in order to substantially satisfy a recovery parameter expressing a target proportion of packets recoverable using error correction data;
   identifying a target encoding bitrate using the determined required level of error correction data so as to not exceed a target transmission bitrate over the network;
   encoding the stream of media frames so as to generate encoded data at the target encoding bitrate; and
   processing the encoded data and error correction data formed in respect of the stream of media frames so as to generate a sequence of packets at a rate commensurate with the target transmission bitrate.

2. A method as claimed in claim 1, wherein the step of encoding the stream of media frames comprises encoding the stream of media frames at a rate commensurate with a frame rate of the stream.

3. A method as claimed in claim 1, wherein the determining and identifying steps comprise:
   for each of a plurality of numbers of data packets per group of one or more media frames, calculating a respective candidate encoding bitrate in dependence on:
   said target transmission bitrate;
   a number of error correction packets determined, using said measure of data loss, for the number of data packets so as to satisfy said recovery parameter; and
   a packetisation overhead associated with the total number of data and error correction packets; and
   selecting the highest calculated candidate encoding bitrate as the target encoding bitrate, the respective number of error correction packets representing said level of error correction data.

4. A method as claimed in claim 3, wherein the number of error correction packets is determined using a lookup table comprising, for each of a plurality of different measures of data loss over the network, different numbers of data packets and, for each number of data packets, a corresponding number of error correction packets required in order to substantially satisfy the recovery parameter.

5. A method as claimed in claim 4, further comprising:
   receiving a report indicative of a number of lost data packets for a prior group of one or more frames represented by a known number of data packets;
   identifying a data point in the lookup table having the number of error correction packets equal to number of lost data packets and the known number of data packets; and
   using the data loss associated with the identified data point as said measure of data loss.

6. A method as claimed in claim 3, wherein the packetisation overhead does not comprise said encoded data or said error correction data.

7. A method as claimed in claim 3, wherein the level of error correction data comprises the number of error correction packets relative to the sum of the numbers of data packets and error correction packets.

8. A method as claimed in claim 3, wherein the step of generating the sequence of packets being performed such that each group of one or more frames of the stream of media frames is represented by the numbers of data packets and error correction packets corresponding to the selected highest encoding bitrate.

9. A method as claimed in claim 3, further comprising:
   in dependence on the selected highest encoding bitrate, determining an amount of encoded data to be transmitted for a particular group of one or more frames of the stream of media frames;
   determining a packet size of data packets so as to substantially evenly distribute said amount of encoded data amongst data packets for said particular group such that the number of data packets for said particular group is equal to the number of data packets corresponding to the selected highest encoding bitrate; and
   performing the step of generating the sequence of packets such that the packet size for the particular group is less than or equal to the determined packet size.

10. A method as claimed in claim 3, wherein each of the plurality of numbers of data packets being a different number such that each of the candidate encoding bitrates corresponds to a number of data packets per group of one or more frames that is different to the other candidates.

11. A method as claimed in claim 3, further comprising:
   reducing the highest calculated encoding bitrate in dependence on a quantisation noise coefficient; and
   using that reduced highest encoding rate as the target encoding bitrate.

12. A method as claimed in claim 3, wherein the step of calculating a respective candidate encoding bitrate comprises:
   calculating a packetisation overhead bitrate by multiplying said packetisation overhead by the number of data and repair packets and a number of groups of one or more frames to be transmitted per second;
   subtracting the packetisation overhead bitrate from the target transmission bitrate so as to form a subtraction result; and
   multiplying said subtraction result by a data packet ratio calculated by dividing the number of data packets by the sum of the number of data packets and the number of error correction packets.

13. An encoder system for generating a sequence of packets representing a stream of media frames, the sequence of packets being configured for transmission over a network, comprising:

a media encoder configured to generate encoded data from a stream of media frames in accordance with an encoding bitrate;
a quality controller configured to:
in dependence on a measure of data loss over the network, determine a level of error correction data required in order to substantially satisfy a recovery parameter expressing a target proportion of packets recoverable using error correction data;
identify a target encoding bitrate using the determined required level of error correction data so as not to exceed a target transmission bitrate over the network; and
cause the media encoder to adapt its encoding bitrate so as to generate encoded data from the stream of media frames at the target encoding bitrate; and
a packetiser configured to process the encoded data and error correction data formed in respect of the stream of media frames so as to generate a sequence of packets at a rate commensurate with the target transmission bitrate.

14. An encoder system as claimed in claim 13, wherein the media encoder is configured to encode media frames of the stream at a rate commensurate with a frame rate of the stream.

15. An encoder system as claimed in claim 13, wherein the quality controller is configured to determine said level of error correction data and identify said target encoding bitrate by, for each of a plurality of numbers of data packets per group of one or more frames, calculating a respective candidate encoding bitrate in dependence on:
said target transmission rate;
a number of error correction packets determined, using said measure of data loss, for the number of data packets so as to satisfy said recovery parameter; and
a packetisation overhead associated with the total number of data and error correction packets, the quality controller being further configured to select the highest calculated candidate encoding bitrate as the target encoding bitrate, the respective number of error correction packets representing said level of error correction data.

16. An encoder system as claimed in claim 15, wherein the number of error correction packets is determined by means of a lookup table comprising, for each of a plurality of different measures of data loss over the network, different numbers of data packets and, for each number of data packets, a corresponding number of error correction packets required in order to substantially satisfy the recovery parameter.

17. An encoder system as claimed in claim 16, wherein the quality controller is configured to:

receive a report indicative of a number of lost data packets for a prior group of one or more frames represented by a known number of data packets,
identify a data point in the lookup table having the number of error correction packets equal to number of lost data packets and the known number of data packets; and
use the data loss associated with the identified data point as said measure of data loss.

18. An encoder system as claimed in claim 15, wherein the packetiser is configured to generate the sequence of packets such that each group of one or more frames of the stream of media frames is represented by the numbers of data packets and error correction packets corresponding to the selected highest encoding bitrate.

19. An encoder system as claimed in claim 15, wherein the quality controller is further configured to:
in dependence on the selected highest encoding bitrate, determine an amount of encoded data to be transmitted for a particular group of one or more frames of the stream of media frames;
determine a packet size of data packets so as to substantially evenly distribute said amount of encoded data amongst data packets for said particular group such that the number of data packets for said particular group is equal to the number of data packets corresponding to the selected highest encoding bitrate, the packetiser being configured to generate the sequence of packets such the packet size for the particular group is less than or equal to the determined packet size.

20. A non-transitory computer readable storage medium having encoded thereon processor executable instructions that when executed, cause at least one processor to:
in dependence on a measure of data loss over the network, determine a level of error correction data required in order to substantially satisfy a recovery parameter expressing a target proportion of packets recoverable using error correction data,
with respect to a sequence of packets representing a stream of media frames, the packets being configured for transmission over a network;
identify a target encoding bitrate using the determined required level of error correction data so as to not exceed a target transmission bitrate over the network;
encode the stream of media frames so as to generate encoded data at the target encoding bitrate; and process the encoded data and error correction data formed in respect of the stream of media frames so as to generate a sequence of packets at a rate commensurate with the target transmission bitrate.

* * * * *